United States Patent [19]

Hoshen

[11] Patent Number: 5,461,390
[45] Date of Patent: Oct. 24, 1995

[54] LOCATOR DEVICE USEFUL FOR HOUSE ARREST AND STALKER DETECTION

[75] Inventor: Joseph Hoshen, Naperville, Ill.

[73] Assignee: AT&T IPM Corp., Coral Gables, Fla.

[21] Appl. No.: 250,259

[22] Filed: May 27, 1994

[51] Int. Cl.$^6$ ..................................................... G01S 5/02
[52] U.S. Cl. ...................... 342/419; 340/825.49; 340/573
[58] Field of Search ................................. 340/539, 573, 340/825.49; 342/419

[56] References Cited

U.S. PATENT DOCUMENTS

| | | | |
|---|---|---|---|
| 4,812,823 | 3/1989 | Dickerson | 340/572 |
| 4,814,751 | 3/1989 | Hawkins | 340/573 |
| 4,825,457 | 4/1989 | Lebowitz | 379/40 |
| 4,858,622 | 8/1989 | Osterwell | 128/782 |
| 4,918,425 | 4/1990 | Greenberg et al. | 340/539 |
| 5,021,794 | 6/1991 | Lawrence | 342/457 |
| 5,146,207 | 9/1992 | Henry et al. | 340/573 |
| 5,170,426 | 12/1992 | D'Alessio et al. | 379/38 |
| 5,196,825 | 3/1993 | Young | 340/539 |
| 5,218,344 | 6/1993 | Ricketts | 340/573 |
| 5,255,306 | 10/1993 | Melton et al. | 379/38 |
| 5,365,516 | 11/1994 | Jandrell | 370/18 |

OTHER PUBLICATIONS

*Journal of Offender Monitoring*, "1993 Electronic Monitoring Equipment Survey", J. B. Vaughn, vol. 6, No. 3, pp. 1–28, ISSN: 1043–500X, Summer, 1993.

*National Institute of Justice*, "Update on NIJ–Sponsored Research: Six New Reports", D. P. Rosenbaum, NCJ 145945, Apr., 1994, pp. 1–5.

*Car & Driver*, "Car 54, Where Are You", May, 1994, pp. 105–115.

Primary Examiner—Thomas H. Tarcza
Assistant Examiner—Dao L. Phan
Attorney, Agent, or Firm—Michael B. Johannesen; Mony R. Ghose

[57] ABSTRACT

A locator device for monitoring the location of subjects, usable in conjunction with a database system connected to a wireless network, wherein the database system causes a polling signal to be sent periodically to each of the subject's locator devices in the area. The locator device includes a wireless transceiver to receive the polling message and, in response, query a location determination device for the current location of the device. This location is then sent back through the wireless network to the database. The database determines from a record on that particular subject where that subject is supposed to be at that time. If the subject being monitored is not within the area where he or she is supposed to be, then the database may automatically contact law enforcement officials.

21 Claims, 5 Drawing Sheets

LOCATOR DEVICE USEFUL FOR HOUSE ARREST AND STALKER DETECTION

TECHNICAL FIELD

This invention relates to the field of remotely monitoring locations of individuals, such as prisoners under house arrest, and, more specifically, to a wireless device for automatically locating house arrest prisoners and other subjects over a wide area and responding to perimeter violations.

BACKGROUND OF THE INVENTION

As America's court system sentences offenders to longer prison terms, America's prison system must deal with over-crowded prisons. Likewise, there is a growing problem of non-violent offenders who are increasingly at risk sharing prisons with violent offenders. Non-prison detentions are being explored as an alternative to incarceration of these non-violent offenders, thus adressing both problems. One such alternative is house arrest.

One measure of the success of house arrest is by the success of the surveillance equipment. In general, house arrest equipment provides a monitor which is secured to the offender. Such monitors may include a radio transmitter which generates radio signals at a predetermined frequency. These signals are then picked up by a local receiver, which is generally connected to a wire-based telephone at the offender's home. The range of these systems is limited to a few hunted yards. Other monitors require that the offender call in to a predetermined location periodically to play a signal across the telephone line. By comparing the caller B of the calling telephone and the signal from the device, the officer in charge of the offender may then determine the offender's location.

The weak links in these systems is that each telephone-based system is limited to a single subject, and both systems are limited in coverage area and/or require a person to monitor the offenders and watch for violations. In addition, the telephone system may be fooled by privacy systems that block the sending of the calling line identification. As a result, many of these systems have failed to stop offenders from violating their assigned areas or times for reporting in, because the monitoring officer was not available, too overworked, or not vigilant.

Therefore, a problem in the art is that house arrest monitors cannot automatically monitor a number of prisoners and automatically contact law enforcement officials when a boundary has been violated by a subject.

SUMMARY OF THE INVENTION

This problem is solved and a technical advance is achieved in the art by locator device for monitoring the location of a plurality of subjects over a wide area. A database system connected to a wireless system causes a polling message to be sent periodically to each of the subject's locator devices within the range of the wireless system. Each locator device includes a wireless transceiver to receive the polling message and, in response, queries a positioning system for the location of the subject. The location is then sent back through the wireless system to the database system. Alternatively, the transceiver may send out a signal which may be triangulated by the wireless system to determine the location of the locator device. The database system determines from a record on that particular subject where that subject is supposed to be at that time and compares this to the subject's actual location. Advantageously, this determination could be a determination of inclusion, wherein the subject is supposed to be within particular bounds, or exclusion, to determine whether the subject has stayed out of a particular area, or some combination thereof. If the subject being monitored is not in an approved area, then the database may automatically contact law enforcement officials. Alternatively, the database may signal the location device to cause some action, such as an audio or visual alarm.

A locator device worn by a subject under house arrest comprises, according to this invention, a position detection system and a communication system, both of which are connected by a bus to a central processing unit. The communication system is primarily configured for data communication, but, advantageously, may be configured for both data and voice communication. The communication system receives a polling message from a wireless system and delivers the message to the central processing unit. In response, the central processing unit causes the position detection system to determine the subject's current location. The location information is then put into a message format and delivered to a data interface of the communication system, which transmits the location information of the subject to the wireless system. Advantageously, a tamper detection device is included in the locator device, in order to inform the central processing unit if the device has been tampered with, which information is then transmitted to the wireless system.

A method according to this invention, performed at a database system, includes the steps of, for each subject in the database, retrieving the subject's database record. A data call is then placed to the subject's location device. If there is no response from the subject, the authorities, such as local police, are alerted. If a response is received from the subject's reported location device, the subject's location is compared to the subject's approved location as determined from the database. Advantageously, the approved locations may change according to the time of day. If the subject is not in an appropriate location, then the authorities are alerted.

In order to alert the authorities, advantageously a search can be made for authorities (such as police, parole or probation officer) in the approximate location of the offender. To this end, each police unit may also carry a locator device according to the apparatus aspects of this invention. The police unit closest to the offender, or the offender's last known position, may then be alerted.

Furthermore, if the subject is a stalker, the stalker's victim can also carry a locator device. The victim's locator device's number is retrieved from the database and a data call made to the victim. The victim's location is determined and then a comparison made between the victim's location and the stalker's location. If the stalker's location is proximal to the victim's, then an alert may be sent to the victim, which may be advantageously via an optional voice link.

BRIEF DESCRIPTION OF THE DRAWINGS

A more complete understanding of the invention may be obtained from a consideration of the following description in conjunction with the drawings, in which.

DETAILED DESCRIPTION

Figure 1:
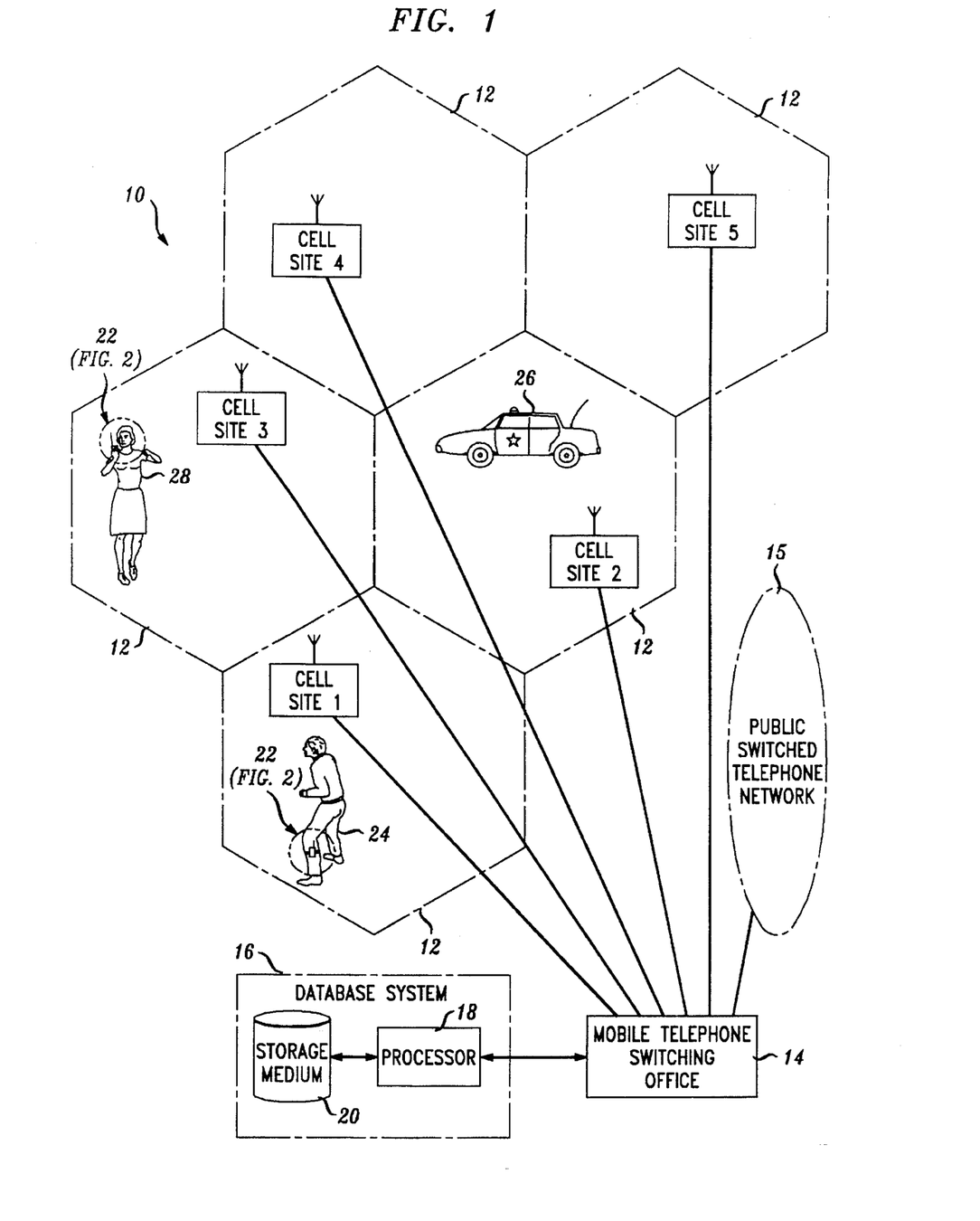
FIG. 1 is a block diagram of a wireless communication system in which an exemplary embodiment of this invention may operate.

FIG. 1 illustrates a wireless communication system 10 in which a locator device and method for using it according to this invention may operate. For purposes of describing this invention, the terms "subject," "prisioner" and "house arrest prisoner" are used to indicate a person being monitored. This device may also be used by a parolee, probation, or any other person that requires determination of location. Wireless communication system 10 comprises a plurality of defined geographical areas or cells 12 in which wireless calls may originate or terminate. Each cell 12 is connected to a mobile telephone switching office 14 by way of cell sites 1–5 (in the illustrated embodiment).

Wireless communication devices communicate with the cell sites by radio signals, wherein the cell sites process the radio signals and switch the call through the mobile telephone switching office 14, as is known in the art. Mobile telephone switching office 14 may further be connected to the public switched telephone network 15 for connection to land line telephones and to other mobile telephone switching offices. Wireless communications system 10 is merely illustrative for purposes of describing an exemplary embodiment of this invention. Any system that has a capability of sending and receiving data packets or messages may be employed without departing from the scope of this invention. For example, a two-way network that delivers data, as is currently known in the art, may be used to implement the invention.

Mobile telephone switching office 14 is connected to a database system 16 according to the exemplary embodiment of this invention. Database system 16 comprises a processor 18 and storage media 20. In an exemplary embodiment of this invention, for each subject, database processor 18 retrieves a record for that subject, and causes a polling message to be sent through mobile telephone switching office 14 via all cell sites (1 through 5) to a locator device 22 associated with subject 24. The polling message may be a standard wireless telephone message which determines whether a specific wireless communication device is present in an area. For purposes of describing the exemplary embodiment, one of the radio channels in wireless communications system 10 is dedicated to this system, so that the many subjects may be served rapidly. A dedicated radio channel also makes the communications portion of the locator device simpler and smaller.

In this exemplary embodiment of this invention, as will be described further below in connection with FIG. 2, locator device 22 (FIG. 1) determines its spatial coordinates from a global positioning system and responds to the polling message with a response message which includes such spatial coordinates. Mobile telephone switching office 14 receives the message from the receiving cell site (in this case, cell site 1) and forwards the message back to database processor 18. Database processor 18 then retrieves location information from a database record (which will be described further below in connection with FIG. 3), and compares the location coordinates sent from the locator device with approved coordinates stored in the database record. Advantageously, these records may include multiple locations, depending upon the time of day.

Alternatively, locator device 22 may broadcast a radio signal for a predetermined period of time at a predetermined frequency responsive to the polling message. This signal may be received, for example, by cell sites 1, 2, and 3. The signal strength (or other parameters) may then be measured by cell sites 1, 2, and 3, and this data delivered through mobile telephone switching office 14 to database system 16. Processor 18 may then determine the location of subject 24 through triangulation of the radio signals. This alternative is desirable in areas where global positioning systems may not function efficiently.

If subject 24 is not in an approved location, then database processor 18 polls known law enforcement locator devices, located in, for example, patrol car 26, to determine which law enforcement unit is closest to subject 24's location. A data (or optional voice) call is set up to the law enforcement agent associated with patrol car 26 and the agent is informed of the subject's location and of the fact that the subject 24 is in violation of his or her boundaries.

Further information may be kept on subject 24. For example, if subject 24 has been judged to be a stalker and has an area of exclusion around his victim 28, the victim may also be equipped with a locator device 22. After the location of stalker 24 is determined at database 16, a further data communication call can be set up from database processor 18 through mobile telephone switching office 14 to determine the location of victim 28. Locator device 22 associated with victim 28 responds to the polling message with its coordinates through a cell site, in this example cell site 3. Mobile telephone switching office 14 receives the coordinates from cell site 3 and sends them to database processor 18.

A comparison may then be made between the position of the stalker 24 and victim 28 to determine if stalker 24 is closer than permitted. If so, a law enforcement agent may be located and informed, as above. Additionally, the victim may be alerted by database processor 18 establishing a data and/or voice connection through mobile telephone switching office 14 and cell site 3 to locator device 22 and informing victim 28 with an audible/visual or other signal that stalker 24 is nearby. In this manner, a house arrest prisoner, such as 24, may be actively monitored and law enforcement agents, such as 26, may be informed immediately of a violation so that meaningful house arrest boundaries may be established. Additionally, stalkers and their potential victims can be monitored for proximity and action taken whenever the stalker moves within a predetermined distance of the intended victim.

Figure 2:
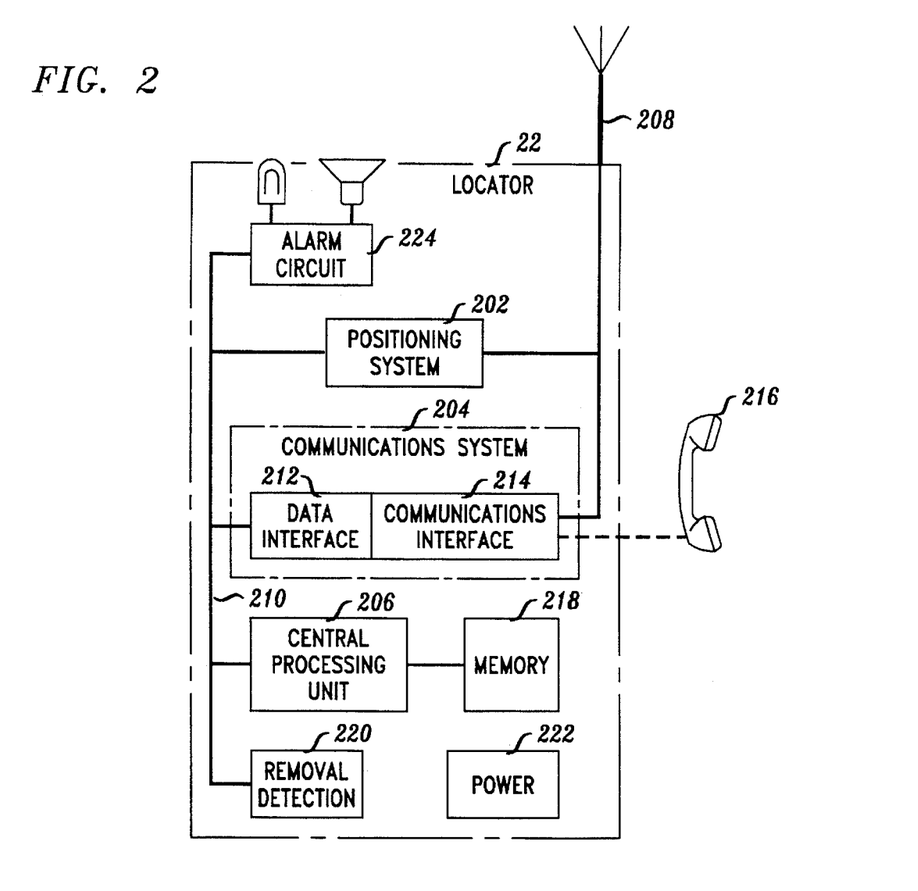
FIG. 2 is a block diagram of a locator device according to an exemplary embodiment of this invention.

Turning now to FIG. 2, a block diagram of an exemplary locator device 22 is shown. According to an exemplary embodiment of this invention, locator device 22 comprises a positioning system 202, a communication system 204, and a central processing unit 206. Positioning system 202 and communication system 204 are connected to antenna 208, as is known in the art to be required for operation. Positioning system 202, communication system 204 and central processing unit 206 are connected via an interface bus 210, as generally known in the art.

Positioning system 202 comprises a commercially a global positioning system card, as is known in the art, and available from Rockwell, Inc. These systems generally determine latitude, longitude, and altitude coordinates by triangulating a plurality of satellite signals. Most systems use three to four satellite signals to determine its coordinates. For civilian use, these coordinates are accurate to within approximately 200 meters but may be as accurate as 30 meters. Global positioning systems are generally described in Car and Driver Magazine, May, 1994, pages 105–114. Other alternatives for positioning system 202 internal to locator device 22 include a system that receives radio signals from known fixed locations and can triangulate such signals. Such signals may be from the wireless cell sites, or may be an independent system. Further, in systems where triangulation is performed external to locator device 22, positioning system 202 is not necessary.

Communication system 204 generally comprises, in this exemplary embodiment, a wireless communication device having a data interface 212 and a communication interface 214. These systems may be a personal communications system or cellular communications system. Data interface 212 comprises a modem, as is known in the art, which can receive data from, for example, central processing unit 206, and convert such data to a form appropriate for transmission. Communication interface 214 comprises a wireless air interface which performs call processing protocol including responding to polling messages, as is known in the art, and provides communication between the communication system 204 and cell sites 1–5.

Optionally, an audio interface 216 for using communication system 204 as a standard personal communication device (wireless and/or cellular telephone) may be included. This can be useful, for example, a victim calling law enforcement agencies and for verbal or audible warnings from database processor 18. Additionally, communication interface 216 can be used for law enforcement agents to communicate with potential victims and/or prisoners. Central processing unit 206 comprises a microprocessor, as is known in the art, and is connected to memory 218, which is used to store operational programs. Communications system 204 may alternatively be a transceiver usable in any data packet or data transfer network, as mentioned above. Such communications system 204 may comprise, in this alternative embodiment, a packet-based two-way radio communications system. In this alternative embodiment, no voice option is possible, but all other functionality is available.

Optionally, locator device 22 may also include a tampering or removal detection circuit 220, such as those described in Dickerson, U.S. Pat. No. 4,812,823. Tampering detection circuit 220 is also attached through bus 210 to central processing unit 206, so that central processor 206 may send a message through personal communication system 204 to alert database system 16 of tampering with locator device 22. Alternatively, a radio frequency may be dedicated for emergency signals. In this case, when tampering is detected, then central processor 206 causes communications system 204 to send an alert on the dedicated emergency frequency. The emergency frequency is monitored continually, and the authorities are notified when a signal is received. Advantageously, each emergency signal may be coded to include the locator device's identification, which can trigger a request for location, as will be described below in connection with FIG. 4, reference numeral 408–420.

Locator device 22 may further include alarm circuit 222 connected to bus 210. Alarm circuit 222 may provide visual or audible alarms under control of central processing unit 206. Alarms may be given, for example, to alert the subject of a perimeter violation or loss of radio contact. Further alarms can alert a victim of the approach of a stalker. Further alarms can be given for system malfunction or low battery, so that the subject can take corrective action. Locator device 22 is powered by rechargeable batteries 222, as known in the art of personal communication systems.

Figure 3:
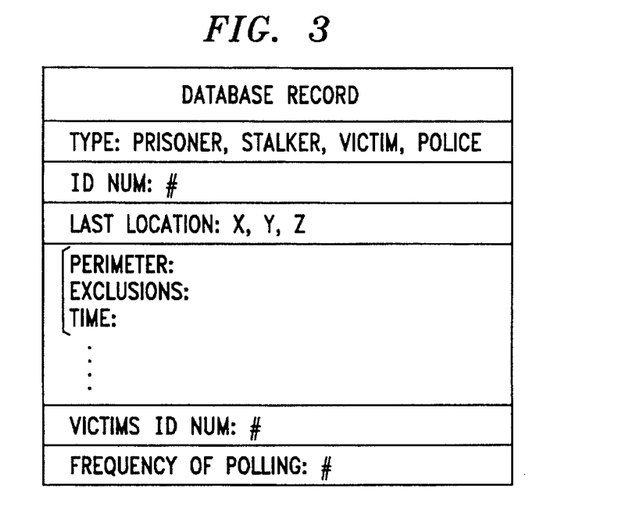
FIG. 3 is an exemplary database record for storing information regarding prisoners according to an exemplary embodiment of this invention.

Turning now to FIG. 3, a typical database record is shown. Database system 16 has one record per locator device to identify the prisoner associated with the locator device. To this end, each database record has a type field, which indicates whether a locator device is associated with a prisoner, a stalker, a victim, police, or other person (e.g., parolee, probationer, etc.). An ID num field identifies the identification number of the locator device, which may be the telephone number, or other number used to establish communications. The next field identifies the last known or reported location of the locator device for this prisoner per the coordinates delivered the last time this locator device was polled.

The next field includes a plurality of records, each one of which contains perimeter coordinates and time of day when this particular record is active. There may be one or multiple records depending on the situation. The next field indicates if this particular type of record is a stalker, and lists the victim's locator device ID number. The final field indicates the frequency of polling to indicate how frequently this particular individual must be watched. Other fields as may become necessary or obvious to one skilled in the art, may be added to this database record. The illustrated fields are just for purposes of describing the interaction of the database system with the locator, as will be shown in the following flowcharts.

Figure 4:
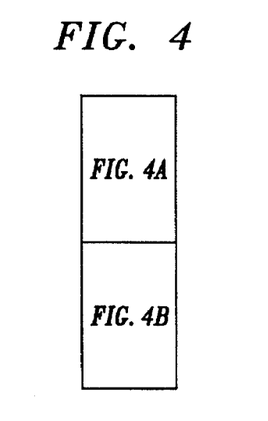
FIG. 4 is a flow chart of the operation of an exemplary embodiment of a method according to this invention.
Figure 4A:
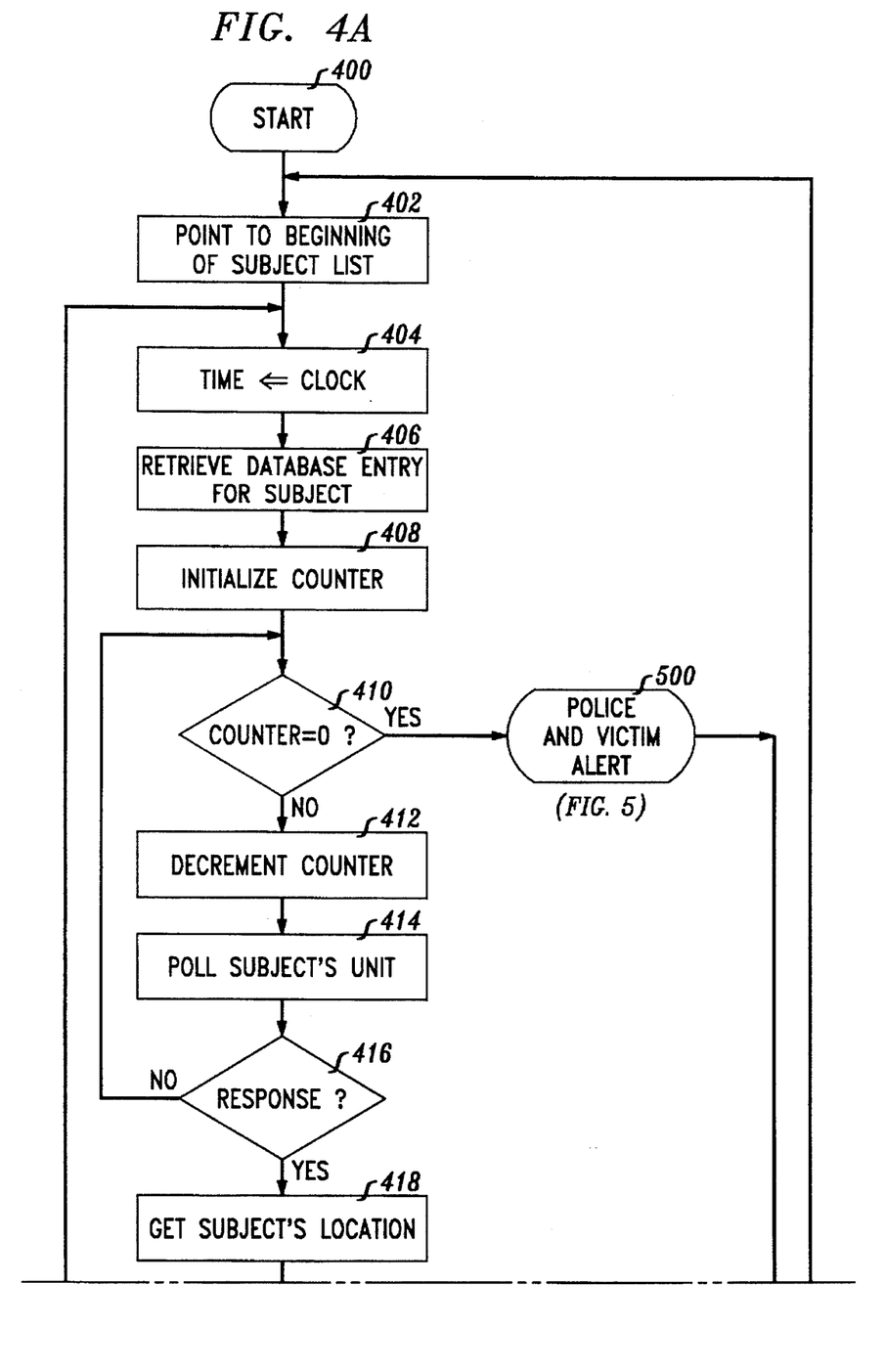

Turning now to FIG. 4, a flow chart of the operation or a database system 16 (FIG. 1) is shown. Processing starts at circle 400 and moves to action box 402, where the first subject in the subject list is identified. The subject list is constructed from the database records present at a given time. Each subject is polled at a frequency determined by the frequency given in the database. The subject list is, therefore, a function of the number of subjects being monitored, the frequency of monitoring for each subject, and the time required for one instance of monitoring. The list may be rebuilt each time a record is added, deleted or changed, or may be rebuilt periodically to ensure that the subject list does not become corrupt and drop records. Processing continues to action box 404 where the time is noted from a database clock. In action box 406, the database record (FIG. 3) for the current subject is retrieved. In action box 408 a counter is initialized and processing proceeds to decision diamond 410 where a determination is made whether counter equal zero. If the counter equals zero, then the database system has not been able to contact the subject's locator device and, in response, the police and potential victim are alerted according to subroutine 500 (FIG. 5), which will be described below.

If, in decision diamond 410, the counter is not equal to zero, then the counter is decremented in action box 412 and, in action box 414, a data call is placed to the subject's locator device. In decision diamond 416, a determination is made whether a response has been received. If a response has not been received, then processing proceeds back to decision diamond 410.

Figure 4B:
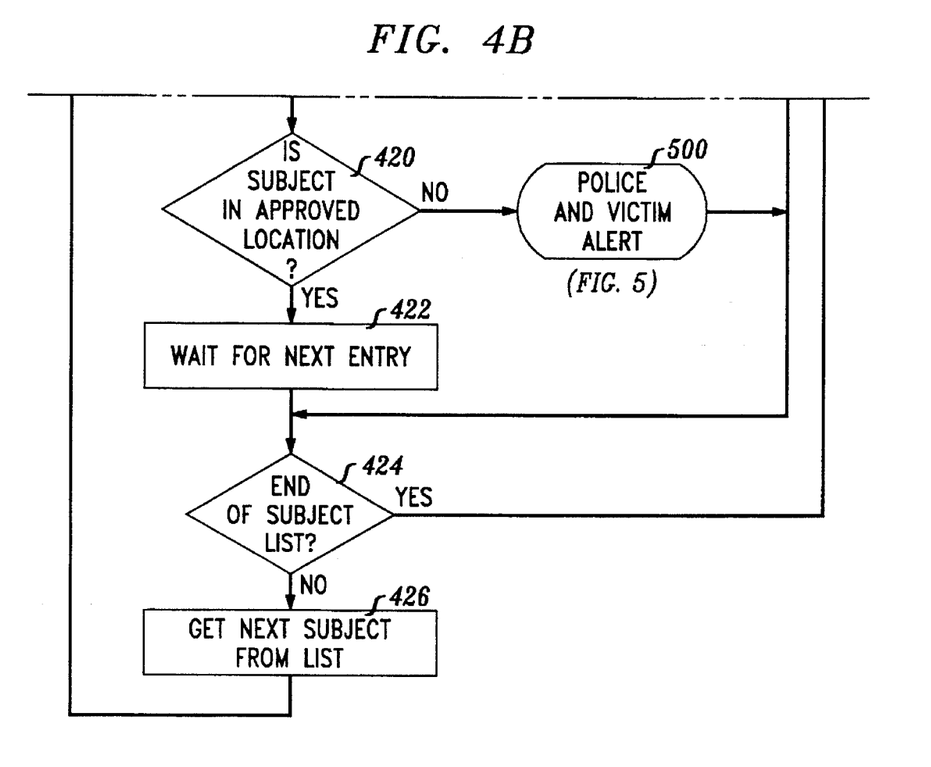

If a response has been received in decision diamond 416, then processing proceeds to action box 418 where the database system retrieves the subject's location from the message response from the subject's locator device. Processing proceeds to decision diamond 420 (FIG. 4b), where a determination is made if the subject is in an approved location. This may be done by determining if the location coordinates of the subject are within a polygon defined by the subject's record from the database. Such algorithms are described in F. P. Preparata, *Computation and Geometry*, Springer-Verlog, 1985.

Figure 5:
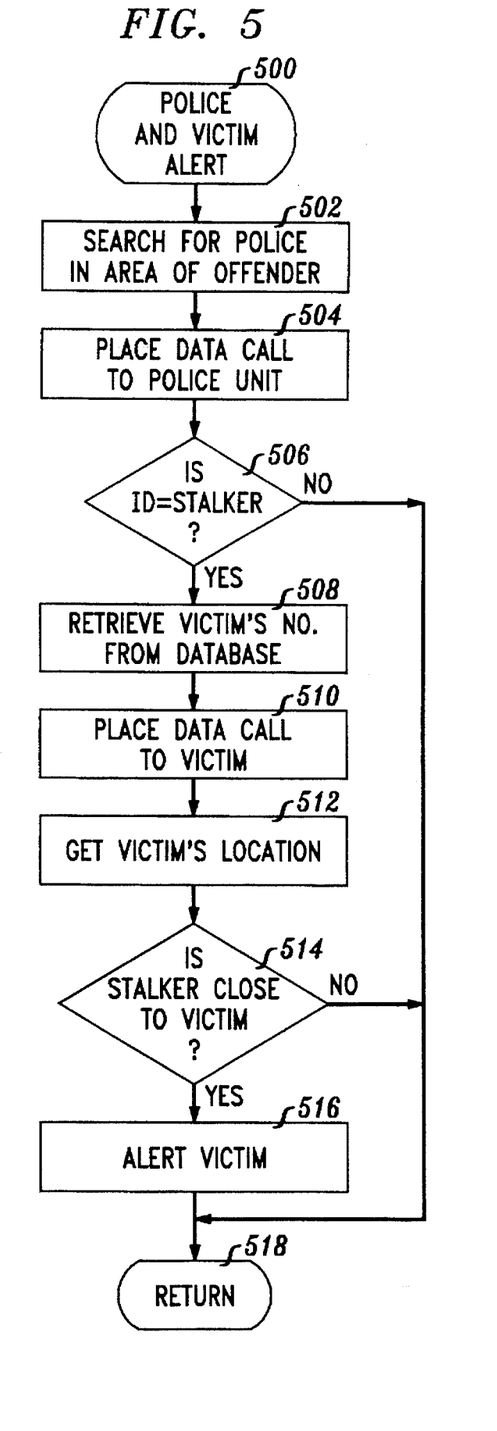
FIG. 5 is a further flow chart of an exemplary operation according to the method of this invention.

If the subject is not in an approved location, then processing moves to subroutine 500, FIG. 5, where the police and any potential victim is alerted. If the subject is within the approved location, then processing continues to action box 422 where, if necessary, a timer is set to wait for the next subject entry. Processing continues to decision diamond 424 where a determination is made if the end of the subject list has been reached. If it has, then processing continues back to action box 402 where the subject list starts again. If it is not, then processing continues to action box 426 where the next subject is selected.

Turning now to FIG. 5, a flow chart of alerting police and the victim is shown. Processing enters at 500 from two different points in flow chart, FIG. 4. Processing starts at action box 502 where a search is made for police units in the area of the subject. This may comprise polling all police units identified in the database or reviewing the database for records identified as police (FIG. 3), and examining last location information.

Processing proceeds to action box 504 where a call is placed to the police unit informing the police of the last beat on of the stalker. The police may advantageously use their global positioning system to determine the shortest route to the offender, or other action may be taken.

Processing proceeds to decision diamond 506 where a determination is made whether an offender is a stalker. If the offender is not a stalker, then processing continues to return box 518. If the offender is a stalker, then processing continues to action box 508 where the locator number is retrieved from the database. A data call is then placed to the victim in action box 510 to retrieve the location information. Alternatively, the location stored in the victim's database record may be used, because the victim will also be periodically polled. In response to receipt of the message back from the victim's locator system, the victim's location is obtained, and, in decision diamond 514, a determination is made if the stalker's location is close to the victim. If the stalker is not close to the victim, then processing proceeds to the return 518. If the stalker is close to the victim, then processing proceeds to action box 516 where the victim is alerted. This may comprise placing a voice call to the victim over the locator system, playing an alert, or taking other action. Processing continues to return 518.

It is to be understood that the above-described embodiments are merely illustrative principles of the invention, and that many variations may be devised by those skilled in the art without departing from the scope of the invention. It is, therefore, intended that such variations be included within the scope of the claims.

I claim:

1. An apparatus usable in a wireless communications system, said apparatus responsive to a message from said wireless communications system for determining its own spatial coordinates and conveying said spatial coordinates via said wireless communications system to a central database, said apparatus comprising:

position determining means for determining said spatial coordinates of said apparatus;

communications means for communicating with said wireless communications system; and central processing means responsive to receipt of said message from said wireless system for causing said position determination means to determine said spatial coordinates and delivering said spatial coordinates to said communications means for transmission of said spatial coordinates to said wireless system.

2. An apparatus according to claim 1 wherein said position determining means comprises a system for determining spatial coordinates based on radio signals.

3. An apparatus according to claim 1 wherein said position determining means comprises a global positioning system operative in response to satellite transmissions.

4. An apparatus according to claim 1 wherein said communications means comprises a personal communications system capable of receiving data messages from said wireless communications system.

5. An apparatus according to claim 1 wherein said communications means comprises a two-way radio system capable of receiving data messages from said wireless communications system.

6. An apparatus according to claim 1 further including tamper detection means for detecting tampering with said apparatus, and for delivering an indication of detected tampering to said communication means for transmission thereof to said wireless system.

7. An apparatus according to claim 1 further including alarm means for providing an alert to perimeter violations, loss of radio contact, and system malfunction.

8. A method for monitoring locations of locator devices for use in conjunction with a wireless system, said locator devices comprising a positioning system and a communications system, said method comprising:

said wireless system sending a message to said locator device;

said locator device receiving said message at said communications system and causing said positioning system to determine spatial coordinates of said locator device;

said communications system in said locator device sending said determined spatial coordinates to said wireless system; said communications system comparing said determined spatial coordinates to preprogrammed spatial coordinates; and wherein said preprogrammed spatial coordinates vary according to time of day.

9. A method according to claim 8 wherein if said locator device is outside of an area defined by said preprogrammed spatial coordinates, said wireless system reporting a violation.

10. A method according to claim 8 wherein if said locator device is inside of an area defined by said preprogrammed spatial coordinates, said wireless system reporting a perimeter violation.

11. A method according to claim 8 wherein if said locator device is proximate to another locator device, said wireless system automatically reporting a violation.

12. A method according to claim 8 wherein said locator device further includes a tampering detector, said method further including the steps of said tampering detector detecting tampering and, in response to detection of tampering reporting to said communications system;

said communications system sending a message to said wireless system; and said wireless system automatically reporting detection of tampering.

13. A method for use in a wireless communications network for automatically monitoring the proximity between a stalker and a victim, wherein directly associated with both said stalker and said victim is a locator device, each said locator device comprising a location determination means and a wireless communications device, said wireless communications network including each of said location devices and a database, said method comprising the steps of:

said database causing said wireless communications network to send a message to said stalker's locator device;

said communications device of said stalker's locator device receiving said message, causing said location determination means in said stalker's locator device to determine spatial coordinates of said stalker's locator device, and sending said stalker's spatial coordinates to said database via said wireless communications network;

said database causing said wireless communications network to send a message to said victim's locator device;

said communications device of said victim's locator device receiving said message, causing said location determination means in said victim's locator device to determine spatial coordinates of said victim's locator device, and sending said victim's spatial coordinates to said database via said wireless communications network;

said database comparing the spatial coordinates of said stalker and said victim, and if said stalker is within a predetermined distance of said victim, said database notifying said victim via said wireless communications system.

14. A method according to claim 13 wherein if said stalker is within said predefined distance of a third party, said database also automatically reporting to said victim.

15. A method according to claim 13 wherein said steps are performed periodically.

16. A method according to claim 13 further including the step of storing said stalker's location, said location corresponding to said stalker's spatial coordinates, in said database.

17. A method according to claim 16 further including the step of, if said database cannot contact said stalker, notifying the authorities of said stalker's last location.

18. A method according to claim 14 wherein said predefined distance may vary according to time of day.

19. A method for monitoring locations of a portable cellular device for use in conjunction with a wireless communications system, said wireless communications system including a plurality of geographic cell sites from which wireless data messages may originate or terminate, a database and a mobile telephone switching office, said method comprising:

said database of said wireless communications system sending a message to said portable cellular device through all said geographic cells sites;

said portable cellular device receiving said message at a communications system;

said portable cellular device determining its spatial coordinates using a position determining means in response to said message received at said communications system; and said portable cellular device transmitting its own spatial coordinates to said wireless communications system via said communications system of said portable cellular device.

20. The apparatus of claim 19 wherein said message sent to all geographic cell sites is a standard telephone control message.

21. The apparatus of claim 19 wherein said position determining means determines said spatial coordinates of said portable cellular device from a global positioning system.

* * * * *

UNITED STATES PATENT AND TRADEMARK OFFICE
CERTIFICATE OF CORRECTION

PATENT NO. : 5,461,390
DATED : October 24, 1995
INVENTOR(S) : Joseph Hoshen

It is certified that error appears in the above-indentified patent and that said Letters Patent is hereby corrected as shown below:

Column 8, line 22, claim 6, change "communication" to --communications--

Column 9, line 31, claim 14, change "a third party," to --said victim,--

Column 9, line 32, claim 14, change "said victim." to --a third party.--

Signed and Sealed this

Twenty-eighth Day of May, 1996

Attest:

BRUCE LEHMAN

*Attesting Officer*      *Commissioner of Patents and Trademarks*